United States Patent [19]
Ross

[11] Patent Number: 6,101,834
[45] Date of Patent: *Aug. 15, 2000

[54] ICE CREAM MACHINE HAVING AN EVAPORATOR TANK WHICH EVENLY FREEZES ICE CREAM

[76] Inventor: Harold F. Ross, 454 Hwy. M 35, Bark River, Mich. 49807

[ * ] Notice: This patent issued on a continued prosecution application filed under 37 CFR 1.53(d), and is subject to the twenty year patent term provisions of 35 U.S.C. 154(a)(2).

[21] Appl. No.: 09/083,340

[22] Filed: May 22, 1998

Related U.S. Application Data

[63] Continuation-in-part of application No. 08/869,040, Jun. 4, 1997, Pat. No. 5,755,106, and a continuation of application No. 08/602,302, Feb. 16, 1995, abandoned.

[51] Int. Cl.[7] .................................................. A23G 9/16
[52] U.S. Cl. ............................................. 62/342; 62/220
[58] Field of Search ............................. 62/342, 343, 217, 62/220, 503; 165/911, 917, DIG. 183

[56] References Cited

U.S. PATENT DOCUMENTS

| | | |
|---|---|---|
| 967,503 | 8/1910 | Davis . |
| 1,698,941 | 1/1929 | Davenport . |
| 1,767,857 | 6/1930 | Sawyer . |
| 1,769,113 | 7/1930 | Davenport . |
| 1,791,041 | 2/1931 | Sawyer . |
| 1,818,364 | 8/1931 | Turnbow . |
| 2,070,729 | 2/1937 | Harsch et al. . |
| 2,156,096 | 4/1939 | Robinson . |
| 2,702,460 | 2/1955 | Gaugler . |
| 3,229,647 | 1/1966 | Von Drachenfels et al. . |
| 3,255,815 | 6/1966 | Smith ........................................ 62/342 |
| 3,264,836 | 8/1966 | Miller et al. .............................. 62/342 |
| 3,803,870 | 4/1974 | Conz . |
| 3,952,534 | 4/1976 | Jacobs . |
| 3,961,494 | 6/1976 | Schaefer et al. . |
| 4,094,168 | 6/1978 | Hamner et al. . |
| 4,162,127 | 7/1979 | Wakeman et al. ........................ 62/343 |
| 4,332,145 | 6/1982 | Yuhasz et al. . |
| 4,758,097 | 7/1988 | Iles, Sr. . |
| 5,158,506 | 10/1992 | Kusano et al. . |
| 5,653,118 | 8/1997 | Cocchi et al. . |

*Primary Examiner*—William E. Tapolcai
*Attorney, Agent, or Firm*—Foley & Lardner

[57] ABSTRACT

An ice cream machine for cooling liquid ice cream into frozen ice cream includes an evaporator having a cylindrical cooling tank and an auxiliary tank or section. The auxiliary tank or section ensures that a cooling chamber is surrounded by liquid refrigerant during normal operation. The flooding of the cylindrical cooling tank provides more efficient and even cooling in an interior cooling chamber. The more efficient cooling allows the ice cream machine to utilize a smaller compressor, thereby reducing the cost and energy consumption of the ice cream machine. The auxiliary tank can be a coil of tubing, a cylindrical container positioned above the cylindrical cooling tank, or a portion of the cylindrical cooling tank.

19 Claims, 3 Drawing Sheets

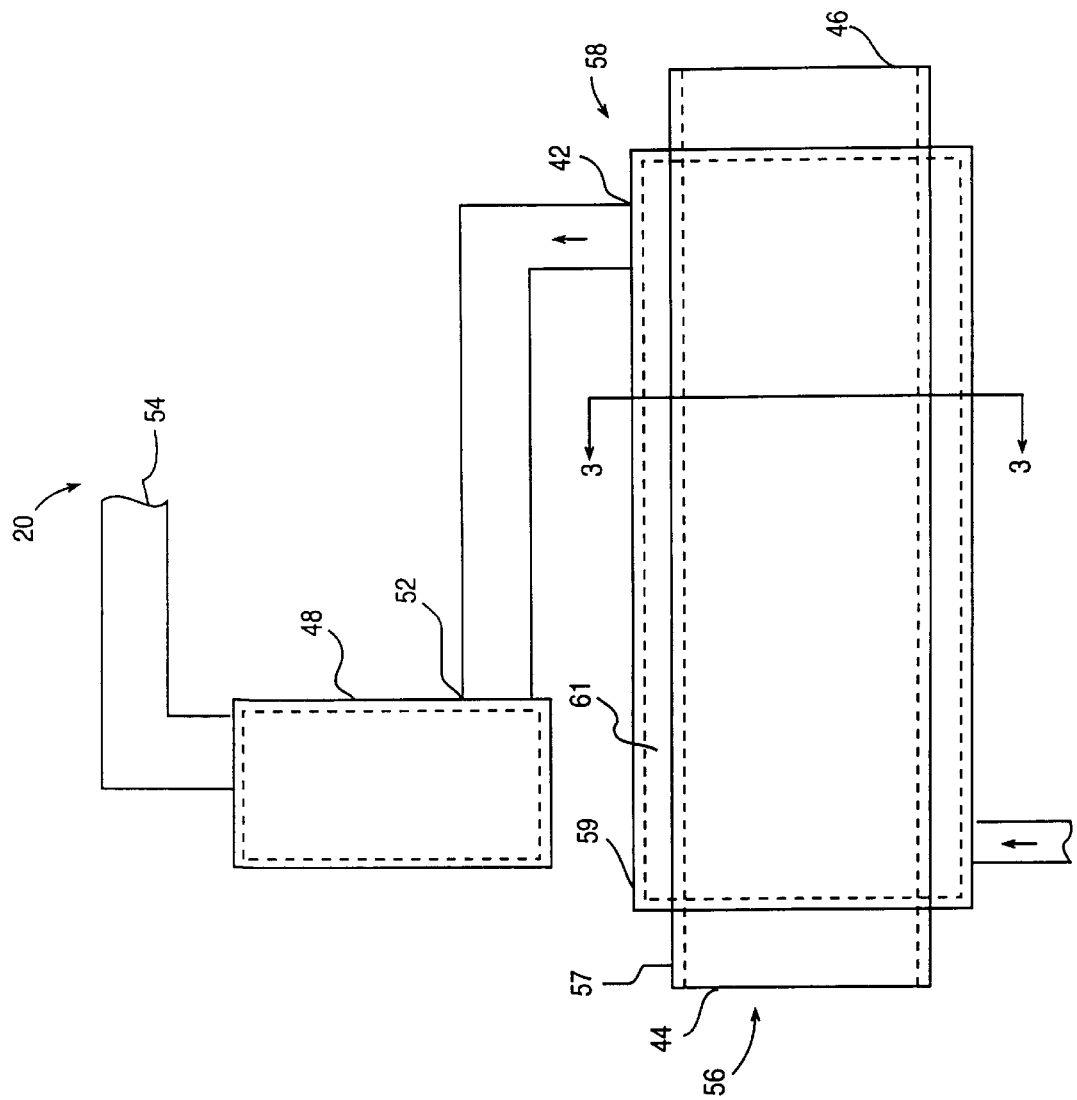
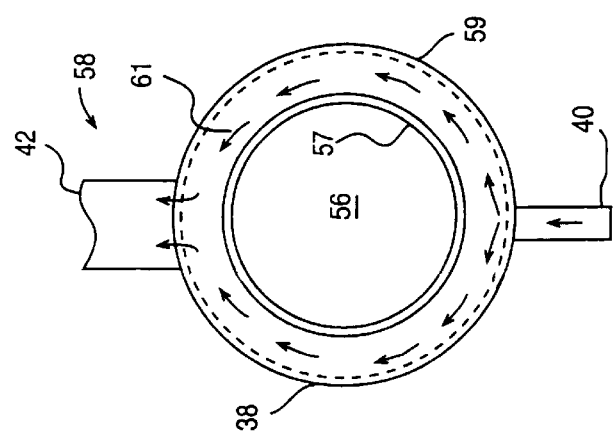
FIG. 2
FIG. 3

ICE CREAM MACHINE HAVING AN EVAPORATOR TANK WHICH EVENLY FREEZES ICE CREAM

CROSS REFERENCE TO RELATED PATENT APPLICATIONS

The present application is a continuation-in-part of U.S. Ser. No. 08/869,040, filed Jun. 4, 1997 which is now U.S. Pat. No. 5,755,106, which was a continuation of U.S. Ser. No. 08/602,302, filed Feb. 16, 1995, abandoned.

FIELD OF THE INVENTION

The present invention relates to refrigeration or cooling systems. More particularly, the present invention relates to a frozen custard or an ice cream machine having an auxiliary evaporator tank.

BACKGROUND OF THE INVENTION

Ice cream or frozen custard machines as well as other systems for cooling or freezing food stuffs, condiments, or other materials, typically include an evaporator situated proximate the material being chilled. For example, in ice cream machines, liquid ice cream is typically inserted in a freezing chamber adjacent the evaporator and is removed from the freezing chamber as solid or semi-solid ice cream. The evaporator removes heat from the freezing chamber as a liquid refrigerant such as FREON®, ammonia, HP62, 502 or other liquid having a low boiling point changes to vapor in response to the heat from the liquid ice cream. Typically, the evaporator is partially filled with vapor as the liquid refrigerant boils (e.g., becomes vapor) in the evaporator.

Since most heat transfer occurs when the liquid refrigerant is changed to vapor, the partially filled evaporator is less efficient than a flooded evaporator (e.g., an evaporator filled entirely with liquid refrigerant). The partially filled evaporator also tends to unevenly cool the ice cream because the parts of the evaporator which are filled with vapor are not able to cool as effectively as the parts of the evaporator filled with liquid. Further, prior art ice cream machines are disadvantageous because the pressure does not remain constant in the evaporator due to the accumulation of vapor. The inefficiencies resulting from the partially filled evaporator require the ice cream machine to use a larger, more expensive, and less energy efficient condenser or pump.

Thus, there is a need for an ice cream machine which utilizes a flooded evaporator. There is also a need for an evaporator which provides even cooling in the freezing chamber.

SUMMARY OF THE INVENTION

The present invention relates to an ice cream making machine including an evaporator, a compressor, and a condenser. The evaporator has a refrigerant input and a refrigerant output. The evaporator also has an interior surface, which defines a cooling chamber, and an outside surface. The cooling chamber has an ice cream input and ice cream output. The outside surface and the interior surface define an evaporator chamber. The refrigerant input is below the refrigerant output. The refrigerant input and the refrigerant output are in fluid communication with the evaporator chamber which is configured to have a first portion located above a remaining portion with respect to gravity. The remaining portion completely surrounds the interior surface. The compressor has a compressor input coupled to the refrigerant output and a compressor output. The condenser has a condenser input which is coupled to the compressor output and a condenser output which is coupled to the refrigerant input. A refrigerant travels from the condenser through the evaporator and to the compressor. The refrigerant is a liquid in the remaining portion of the evaporator chamber, thereby providing superior cooling in the evaporator.

The present invention further relates to a frozen custard making system including a compressor and an evaporator system which has a refrigerant input and a refrigerant output. The evaporator system has an interior surface, which defines a cooling chamber for chilling a custard product, and an outside surface. The inside surface and the outside surface define an evaporator chamber. The evaporator chamber has a first portion above a second portion. The compressor receives a vapor refrigerant and provides a liquid refrigerant to the evaporator system. Superior cooling of the custard product in the evaporator system is obtained by completely filling the second portion with the liquid refrigerant. The first portion receives the vapor refrigerant, thereby allowing the cooling chamber to be surrounded with the liquid refrigerant.

The present invention still further relates to an ice cream freezing machine including an evaporator having a refrigerant input at a bottom side of the evaporator and a refrigerant output at a top side of the evaporator, a compressor having a compressor input and a compressor output, a condenser having a condenser input coupled to the compressor output and a condenser output coupled to the refrigerant input. The evaporator has an interior surface defining an interior cooling chamber and an exterior surface. The interior surface and the exterior surface define an evaporator chamber. The cooling chamber has a custard input and a custard output. A refrigerant travels from the condenser through the evaporator the compressor. The exterior surface is shaped so the refrigerant completely surrounds the interior cooling chamber as a liquid, thereby providing superior cooling in the cooling chamber.

In one aspect of the present invention, an evaporator is configured to have a portion or an auxiliary tank which is positioned above (e.g., located higher than) the section of the evaporator which chills the ice cream. The auxiliary tank may be a coil of copper tubing or a container such as a cylindrical or spherical reservoir. The auxiliary tank ensures that the cylindrical evaporator is flooded with liquid refrigerant such as FREON or HP62. The portion can be a rectangular, cylindrical, or spherical section which ensures that the evaporator remains flooded at the section of the evaporator where the ice cream is chilled.

According to another aspect of the present invention, the evaporator is a cylindrical evaporator having an interior cooling chamber. Liquid ice cream is inserted into the interior cooling chamber and exits the cooling chamber as solid ice cream. Alternatively, frozen custard, yogurt, condiments, or other food stuffs may be chilled or frozen in the cooling chamber. The interior cooling chamber remains completely surrounded by liquid refrigerant due to the configuration of the evaporator.

BRIEF DESCRIPTION OF THE DRAWINGS

The invention will hereafter be descried with reference to the accompanying drawings, wherein like reference numerals denote like elements, and:

FIG. 2 is a more detailed side view schematic diagram of the cylindrical cooling tank and auxiliary tank illustrated in FIG. 1;

FIG. 3 is a cross-sectional view of the cylindrical cooling tank illustrated in FIG. 2 at line 3—3;

DETAILED DESCRIPTION OF THE PREFERRED EXEMPLARY EMBODIMENT OF THE PRESENT INVENTION

Figure 1:
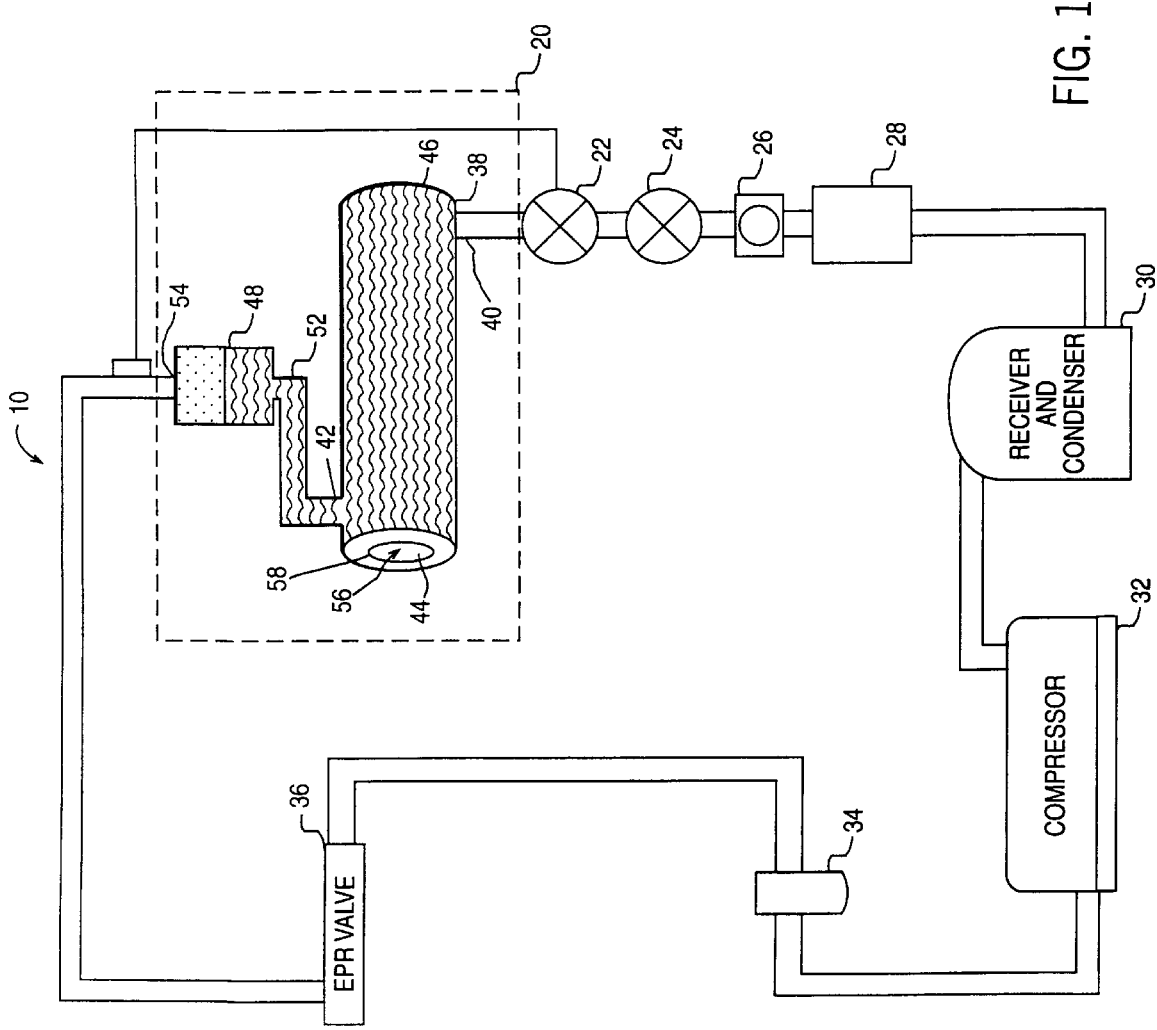
FIG. 1 is a schematic diagram illustrating an ice cream machine in accordance with an exemplary embodiment of the present invention.

A cooling system or ice cream machine 10 is diagramically shown in FIG. 1. Ice cream machine 10 includes an evaporator 20, an expansion device 22, such as, a valve, a shut off device 24, such as, a solenoid valve, a sight glass 26, a filter 28, a condenser 30, a compressor 32, an accumulator 34, and a valve 36. Evaporator 20 includes a cylindrical cooling tank 38 and an auxiliary tank 48. Machine 10 can be manufactured without glass 26, valve 36 or device 24.

Cylindrical cooling tank 38 includes a refrigerant input 40, a refrigerant output 42, a liquid ice cream input 44, and a solid ice cream output 46. Auxiliary tank 48 includes a liquid refrigerant input 52 and a vapor refrigerant output 54. Cylindrical cooling tank 38 includes a cooling chamber 56 defined by an interior surface, wall, or tube 57 of tank 38.

Auxiliary tank 48 is positioned above with respect to gravity or over cylindrical cooling tank 38. Additionally, liquid refrigerant input 52 is located above refrigerant output 42, and refrigerant input 40 of tank 38 is located beneath refrigerant output 42 of tank 38. Vapor refrigerant output 54 of tank 48 is located above liquid refrigerant input 52 of tank 48.

With reference to FIGS. 2 and 3, cylindrical cooling tank 58 is manufactured from an outside tube 59 having an inside diameter of 4.75 inches, an outside diameter of 5 inches, and a length of 27.75 inches, and an inner tube 57 having an inside diameter of 3.75 inches, an outside diameter of 3.875 inches, and a length of 30 inches. Preferably, wall 58 is 0.125 inches thick. The volume of interior cooling chamber 56 is approximately 331 cubic inches. The volume of an evaporator chamber 61 between outer tube 59 and inner tube 57 has a volume of approximately 165.1 cubic inches. Auxiliary tank 48 is preferably a piece of tubing or other container having a length of 7 inches, a width of 2 inches, and a depth of 4 inches. The approximate volume of tank 48 is 56 cubic inches.

The operation of ice cream machine 10 is described below with reference to FIGS. 1–3. Compressor 32 provides high pressure vapor refrigerant to condenser 30. Ice cream machine 10 may utilize a refrigerant such as ammonia, FREON, HP62, or other substance having a low boiling point. The type of refrigerant is not a limiting factor with respect to the present invention.

Condenser 30 provides high pressure liquid refrigerant through filter 28, sight glass 26 and solenoid device 24 to expansion device 22. Expansion device 22 provides low pressure liquid refrigerant to evaporator 20. More particularly, low pressure liquid refrigerant is provided to refrigerant input 40 of cylindrical cooling tank 38. The low pressure liquid refrigerant in cooling tank 38 is boiled due to the heat from cooling chamber 56, to form low pressure vapor refrigerant which accumulates in auxiliary tank 48. The low pressure liquid refrigerant in cylindrical cooling tank 38 preferably cools or freezes the liquid ice cream from input 44 in cooling chamber 56. Although, ice cream is disclosed, other food stuffs, substances, or condiments may be utilized in machine 10.

More particularly, the warmer liquid ice cream with respect to the liquid refrigerant provided to liquid ice cream input 44 is cooled and provided as frozen ice cream at ice cream output 46 as the low pressure liquid refrigerant is transferred from liquid to vapor. The low pressure vapor refrigerant collects via auxiliary tank 48. Preferably, system 10 is provided with enough liquid refrigerant so that all of cylindrical cooling tank 38 is filled and auxiliary tank 48 is two-thirds to one-half filled with liquid refrigerant during normal operation of ice cream machine 10.

The low pressure vapor refrigerant in tank 48 travels from vapor refrigerant output 54 through valve 36 and accumulator 34 to compressor 32. Compressor 32 changes the low pressure vapor refrigerant to high pressure vapor refrigerant and provides the high pressure vapor refrigerant to condenser 30. Condenser 30 changes the high pressure vapor refrigerant to high pressure liquid refrigerant which is provided to device 22.

The flooding of tank 38 advantageously provides even cooling as liquid ice cream travels from ice cream input 44 to ice cream output 46 because the temperature and pressure of the low pressure liquid refrigerant in cylindrical cooling tank 38 is maintained constant. Therefore, the ice cream in cooling chamber 56 is chilled evenly wherever it is vertically located within cooling chamber 56. Prior art cooling tanks tended to chill the ice cream unevenly near the top of the evaporator because liquid refrigerant was only located on the bottom of the evaporator.

The use of such an advantageous evaporator 20 allows system 10 to be designed with a relatively small compressor 32. The small size of compressor 32 makes ice cream machine 10 less expensive and more energy efficient. Preferably, auxiliary tank 48 may be a coil of copper tubing located above cylindrical cooling tank 38. Preferably, auxiliary tank 48 is a tank located above cylindrical cooling tank 38 such as a cylindrical or spherical tank, reservoir, can, or other container. Cylindrical cooling tank 38 preferably has almost three times the volume of auxiliary tank 48.

With reference to FIGS. 4–7, alternative embodiments for an advantageous evaporator 20 are described as follows. The embodiments of evaporator 20 shown in FIGS. 4–7 replace evaporator 20 in system 10 described with reference to FIG. 1 wherein like numerals denote like elements. However, the various dimensions given with respect to FIG. 1 can be adjusted and modified in accordance with the operational principles of the present invention. Evaporators 20 shown in FIGS. 4–7 advantageously do not include a separate auxiliary evaporator such as auxiliary tank 48 shown in FIG. 1. Instead, evaporators 20 are advantageously shaped so that cooling chamber 56 is completely surrounded by liquid refrigerant as vapor accumulates above chamber 56 (e.g., at the top of evaporator 20).

Figure 4:
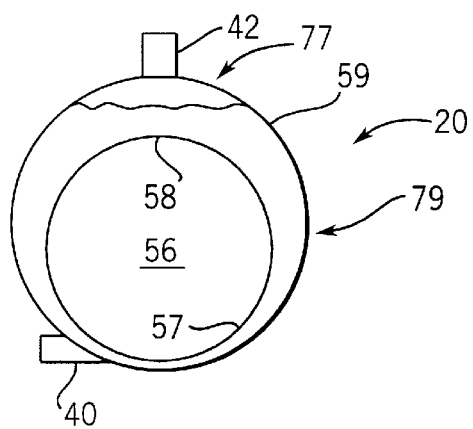
FIG. 4 is a cross-sectional view of an alternative evaporator for use in a system similar to the system illustrated in FIG. 1.

With reference to FIG. 4, evaporator 20 includes a first portion 77 which collects vapor refrigerant and a second portion 79 which contains liquid refrigerant and completely surrounds cooling chamber 56. First portion 77 is above second portion 79 with respect to gravity. Evaporator 20 in FIG. 4 is configured by lowering inside tube 57 with respect to outside tube 59 (e.g., inside tube 57 is not concentric with outside tube 59). Tube 59 can be adjusted to be larger to ensure that liquid refrigerant completely surrounds inner tube 57. Refrigerant output 42 is located above refrigerant input 40 with respect to gravity.

Figure 5:
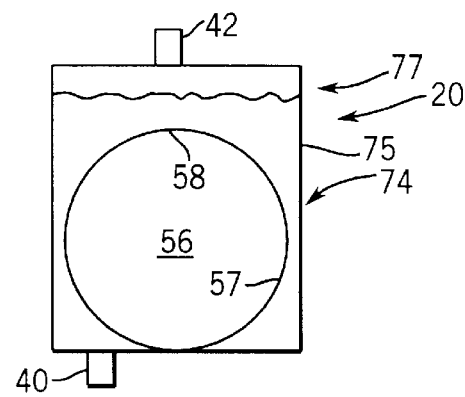
FIG. 5 is yet another cross-sectional view of an alternative evaporator for use in a system similar to the system illustrated in FIG. 1.

With reference to FIG. 5, tube 57 is provided in an outer section 75. Outer section 75 has a rectangular cross sectional area instead of the circular cross section of tube 59 (FIG. 3). Outer section 75 has a substantially greater height than tube 57 to ensure that second portion 79 can completely contain tube 57. In this way, cooling chamber 56 is completely surrounded by liquid refrigerant.

Figure 6:
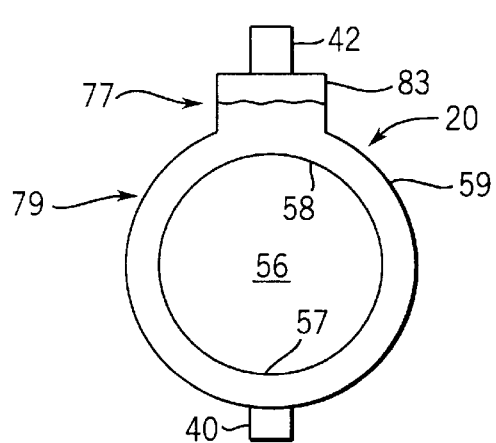
FIG. 6 is yet another cross-sectional view of an alternative evaporator for use in a system similar to the system illustrated in FIG. 1.

In FIG. 6, outer tube 59 includes a rectangular section 83 provided at the top of outer tube 59. Rectangular chamber 83 replaces auxiliary tank 48 with reference to FIGS. 1–3. Vapor refrigerant is accumulated in first portion 77 associated with rectangular chamber 83 and second portion 79 has liquid refrigerant which completely surrounds cooling chamber 56.

Figure 7:
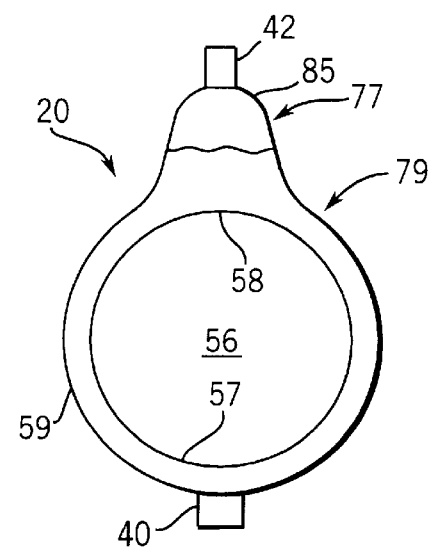
FIG. 7 is still another cross-sectional view of an alternative evaporator for use in a system similar to the system illustrated in FIG. 1.

With respect to FIG. 7, evaporator 20 is similar to evaporator 20 discussed with reference to FIG. 6. However, a spherical or cylindrical chamber 85 is provide at a top of outer tube 59. Chamber 85 operates similar to chamber 83 discussed with reference to FIG. 6.

It is understood that, while the detailed drawings and specific examples given to describe the preferred exemplary embodiment of the present invention, they are for the purpose of illustration only. The apparatus of the invention is not limited to the precise details and conditions disclosed. For example, although food stuffs and ice cream are mentioned, the invention may be utilized in a variety of refrigeration or cooling systems. Further, single lines for carrying liquid refrigerant can represent multiple tubes. Additionally, although a particular valve, accumulator, compressor, condenser and filter configuration is shown, the advantageous evaporator 20 may be utilized in other cooling systems. Further still, evaporator 20 can have any number of shapes or sizes which ensure that cooling chamber 56 is surrounded by liquid refrigerant. Various changes can be made to the details disclosed without departing from the spirit of the invention which is defined by the following claims.

I claim:

1. An ice cream making machine, comprising:
    an evaporator system having a refrigerant input, and a refrigerant output, the evaporator system having an interior surface defining a cooling chamber, the cooling chamber having an ice cream input and an ice cream output, the evaporator system having an outside surface, the outside surface and the interior surface defining an evaporator chamber, the refrigerant input being below the refrigerant output, the refrigerant input and the refrigerant output being in fluid communication with the evaporator chamber, the evaporator chamber being configured to have an auxiliary evaporator portion, the auxiliary evaporator portion being an outward vertical protrusion on an upper portion of the outside surface, the auxiliary evaporator portion located above a primary evaporator with respect to gravity, the primary evaporator completely surrounding the interior surface;
    a compressor having a compressor input coupled to the refrigerant output and a compressor output; and
    a condenser having a condenser input coupled to the compressor output and a condenser output coupled to the refrigerant input, whereby a refrigerant travels from the condenser through the evaporator system and to the compressor, the refrigerant being a liquid in the primary evaporator, thereby providing superior cooling in the evaporator.

2. The ice cream making machine of claim 1, wherein the auxiliary evaporator portion is defined on the outside surface by the outward vertical protrusion.

3. The ice cream making machine of claim 2, wherein the outward vertical protrusion is substantially rectangular, cylindrical or spherical.

4. The ice cream making machine of claim 3, wherein the auxiliary evaporator portion has a volume at least 0.33 times a volume of the primary evaporator.

5. The ice cream making machine of claim 1, wherein the outside surface is substantially rectangular.

6. The ice cream making machine of claim 1, wherein the auxiliary evaporator portion is an evaporator reservoir.

7. A frozen custard making system comprising:
    a compressor; and
    an evaporator system, the evaporator system having a refrigerant input and a refrigerant output, the evaporator system having an interior surface defining a cooling chamber for chilling a custard product, the evaporator system having an outside surface, the inside surface and the outside surface defining an evaporator chamber, the evaporator chamber having an auxiliary evaporator portion, the auxiliary evaporator portion formed by an outward vertical protrusion on an upper portion of the outside surface, the auxiliary evaporator portion above a primary evaporator portion wherein the compressor receives a vapor refrigerant and provides liquid refrigerant to the evaporator system, whereby superior cooling of the custard product in the evaporator system is attained by completely filling the primary evaporator portion with the liquid refrigerant and the primary evaporator portion is in fluid communication with the refrigerant input, whereby the auxiliary evaporator portion receives the vapor refrigerant and is in fluid communication with the refrigerant output, thereby allowing the cooling chamber to be surrounded with the liquid refrigerant.

8. The frozen custard making system of claim 7, wherein the outward vertical protrusion is rectangular.

9. The frozen custard making system of claim 7, wherein the outside surface is essentially cylindrical.

10. The frozen custard making system of claim 9, wherein the auxiliary evaporator portion has a volume at least .33 times a volume of the primary evaporator portion.

11. The frozen custard making system of claim 7, wherein the custard product is evenly frozen in the evaporator system.

12. The frozen custard making system of claim 7, wherein the auxiliary evaporator portion is two-thirds filled with the liquid refrigerant.

13. The frozen custard making system of claim 11, wherein the primary evaporator portion is a cylindrical section.

14. The frozen custard making system of claim 12, wherein the auxiliary evaporator portion is spherical.

15. A custard freezing machine comprising:
    an evaporator having a refrigerant input at a bottom side of the evaporator, and a refrigerant output at a top side of the evaporator, the evaporator having an interior surface defining an interior cooling chamber, and an exterior surface, the interior surface and the exterior surface defining an evaporator chamber, the cooling chamber having a custard input and a custard output;

a compressor having a compressor input and a compressor output;

a condenser having a condenser input coupled to the compressor output and a condenser output coupled to the refrigerant input; and wherein a refrigerant travels from the condenser through the evaporator to the compressor, wherein the exterior surface is shaped so the refrigerant completely surrounds the interior cooling chamber as a liquid, the exterior surface including an outward vertical protrusion on the upper portion of the exterior surface, thereby providing superior cooling in the cooling chamber.

16. The custard freezing machine of claim 15, wherein the evaporator includes a first tube forming the interior surface and a second tube forming the exterior surface, the second tube including the outward vertical protrusion on the upper portion of the exterior surface.

17. The custard freezing machine of claim 16, wherein the second tube is not concentric with the first tube.

18. The custard freezing machine of claim 16, wherein the exterior surface has a rectangular protrusion located above the interior surface.

19. The custard freezing machine of claim 15, wherein the exterior surface has a cylindrical or spherical protrusion located above the interior surface.

* * * * *

UNITED STATES PATENT AND TRADEMARK OFFICE
CERTIFICATE OF CORRECTION

PATENT NO. : 6,101,834
DATED : August 15, 2000
INVENTOR(S) :
Harold F. Ross

It is certified that error appears in the above-identified patent and that said Letters Patent is hereby corrected as shown below:

Cover page, in Related U.S. Application Data line 3, please delete "Feb. 16, 1995" and insert therefor --Feb. 16, 1996--.

Column 1, line 10, please delete "Feb. 16, 1995" and insert therefor --Feb. 16, 1996--.

Signed and Sealed this

Seventeenth Day of April, 2001

*Attest:*

NICHOLAS P. GODICI

*Attesting Officer*     Acting Director of the United States Patent and Trademark Office